(12) United States Patent
Gestner et al.

(10) Patent No.: US 8,948,318 B2
(45) Date of Patent: Feb. 3, 2015

(54) INCREMENTAL LATTICE REDUCTION SYSTEMS AND METHODS

(75) Inventors: Brian Gestner, Dublin, CA (US); David Verl Anderson, Alpharetta, GA (US); Xiaoli Ma, Norcross, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 513 days.

(21) Appl. No.: 13/325,242

(22) Filed: Dec. 14, 2011

(65) Prior Publication Data

US 2012/0263261 A1    Oct. 18, 2012

Related U.S. Application Data

(60) Provisional application No. 61/422,871, filed on Dec. 14, 2010.

(51) Int. Cl.
     *H04L 27/06*      (2006.01)
     *H04L 25/03*      (2006.01)

(52) U.S. Cl.
     CPC .... *H04L 25/03203* (2013.01); *H04L 25/03305* (2013.01); *H04L 25/03242* (2013.01); *H04L 2025/03426* (2013.01)
     USPC ........... 375/341; 375/260; 375/262; 375/267; 375/340; 375/347; 375/349; 714/795; 714/794

(58) Field of Classification Search
     CPC ............... H04L 25/03242; H04L 2025/03426; H04L 25/067; H04L 25/0204; H04L 1/0631; H04L 27/2647; H04L 2025/03414; H04L 27/38; H04L 1/005; H04L 25/03006; H04L 25/03203; H04L 1/0054; H04L 25/03305; H04L 25/03171; H04L 25/03191; H04L 25/0328; H04L 27/0008; H04L 2025/03458; H04L 2025/03605; H04L 25/0202; H04L 25/03968; H04B 7/0413; H04B 7/0854; H03M 13/41
     USPC ......... 375/260, 262, 267, 340, 341, 347, 349; 714/795, 794
     See application file for complete search history.

(56) References Cited

U.S. PATENT DOCUMENTS

| 7,668,268 | B2 * | 2/2010 | Heiskala | 375/348 |
| 7,945,008 | B2 * | 5/2011 | Milliner et al. | 375/367 |
| 8,116,399 | B2 * | 2/2012 | Gan et al. | 375/267 |
| 8,346,175 | B2 * | 1/2013 | Milliner et al. | 455/67.11 |
| 8,462,867 | B2 * | 6/2013 | van Zelst et al. | 375/262 |

* cited by examiner

*Primary Examiner* — Rahel Guarino
(74) *Attorney, Agent, or Firm* — Troutman Sanders LLP; Ryan A. Schneider; Dustin B. Weeks (57) ABSTRACT

An exemplary embodiment of the present invention provides an incremental lattice reduction method comprising: receiving an input signal at a plurality of input terminals; evaluating a reliability assessment condition using a primary symbol vector estimate of at least a portion of the input signal; terminating the incremental lattice reduction method if the reliability assessment condition is satisfied; and if the reliability assessment condition is not satisfied, performing at least one iteration of a lattice reduction detection sub-method to obtain a secondary symbol vector estimate.

20 Claims, 8 Drawing Sheets

```
COMPLEX LLL ALGORITHM WITH THE SIEGEL CONDITION
```

(1)    $[\tilde{Q}, \tilde{R}, T]$ = sorted QR $(\tilde{H})$; $k = 2$; $g = (1+j)\mathbf{1}_{N_t \times 1}$;
(2)    while $k \leq N_t$
(3)      for $n = k - 1 : -1 : 1$
(4)        $u = \text{round}(\tilde{R}_{n,k}/\tilde{R}_{n,n})$            ⎫
(5)        $\tilde{R}_{1:n,k} = \tilde{R}_{1:n,k} - u \cdot \tilde{R}_{1:n,n}$    ⎬ *size reduction*
(6)        $T_{:,k} = T_{:,k} - u \cdot T_{:,n}$               ⎪
(7)        $g_n = g_n + u \cdot g_k$                ⎭
(8)      end
(9)      if $|\tilde{R}_{k-1,k-1}|^2 > \zeta|\tilde{R}_{k,k}|^2$    *Siegel condition evaluation*
(10)        $\Theta = \frac{1}{\|\tilde{R}_{k-1:k,k}\|} \begin{bmatrix} \tilde{R}_{k-1,k}^* & \tilde{R}_{k,k} \\ -\tilde{R}_{k,k} & \tilde{R}_{k-1,k} \end{bmatrix}$    ⎫
(11)        $\tilde{R}_{k-1:k,k-1:N_t} = \Theta\tilde{R}_{k-1:k,k-1:N_t}$      ⎬ *basis update*
(12)        $\tilde{Q}_{:,k-1:k} = \tilde{Q}_{:,k-1:k}\Theta^{\mathcal{H}}$          ⎭
(13)        Swap $(k-1)$-th and $k$-th columns in $\tilde{R}$ and $T$
(14)        Swap $(k-1)$-th and $k$-th rows in $g$
(15)        $k = \max(k-1, 2)$;
(16)      else
(17)        $k = k + 1$
(18)      end
(19)    end

COMPLEX LLL ALGORITHM WITH THE SIEGEL CONDITION (1)  $[\tilde{Q}, \tilde{R}, T]$ = sorted QR $(\bar{H})$; $k = 2$; $g = (1+j)\mathbf{1}_{N_t \times 1}$;
(2)  while $k \leq N_t$
(3)    for $n = k-1 : -1 : 1$
(4)      $u = \text{round}(\tilde{R}_{n,k}/\tilde{R}_{n,n})$ ⎫
(5)      $\tilde{R}_{1:n,k} = \tilde{R}_{1:n,k} - u \cdot \tilde{R}_{1:n,n}$ ⎬ *size reduction*
(6)      $T_{:,k} = T_{:,k} - u \cdot T_{:,n}$ ⎪
(7)      $g_n = g_n + u \cdot g_k$ ⎭
(8)    end
(9)    if $|\tilde{R}_{k-1,k-1}|^2 > \zeta|\tilde{R}_{k,k}|^2$    *Siegel condition evaluation*
(10)     $\Theta = \dfrac{1}{\|\tilde{R}_{k-1:k,k}\|}\begin{bmatrix} \tilde{R}^*_{k-1,k} & \tilde{R}_{k,k} \\ -\tilde{R}_{k,k} & \tilde{R}_{k-1,k} \end{bmatrix}$ ⎫
(11)     $\tilde{R}_{k-1:k,k-1:N_t} = \Theta \tilde{R}_{k-1:k,k-1:N_t}$ ⎬ *basis update*
(12)     $\tilde{Q}_{:,k-1:k} = \tilde{Q}_{:,k-1:k}\Theta^{\mathcal{H}}$ ⎭
(13)     Swap $(k-1)$-th and $k$-th columns in $\tilde{R}$ and $T$
(14)     Swap $(k-1)$-th and $k$-th rows in $g$
(15)     $k = \max(k-1, 2)$;
(16)   else
(17)     $k = k+1$
(18)   end
(19) end

| | INCREMENTAL CLLL-MMSE-SIC BASED ON THE SIEGEL CONDITION |
|---|---|
| (1) | $[\tilde{Q}^{(1)}, \tilde{Q}^{(2)}, \tilde{R}, T] = \text{SORTED\_QR}(\bar{H})$    *Packet* |
| (2) | $g = (1+j)1_{N_t \times 1};\ k = 2;\ \tilde{Q} = \tilde{Q}^{(1)}$    *Initialization* |
| (3) | $\bar{b} = \frac{1}{2}\left(\tilde{Q}^{\mathcal{H}} y + \tilde{R} g\right)$ |
| (4) | $\gamma = \frac{1}{4}(\bar{A}\sigma_w)^2;\ a_{(N_t+1)} = 0;\ l = N_t;\ update = \text{true}$ |
| (5) | while (1) |
| (6) |   if *update* |
| (7) |     for $n = k : 1 : N_t$ |
| (8) |       if $|\tilde{R}_{n-1,n-1}| > \sqrt{\zeta}|\tilde{R}_{n,n}|$ |
| (9) |         break;        *early Siegel* |
| (10) |       end               *condition* |
| (11) |       if $n == N_t$      *evaluation* |
| (12) |         $\gamma = -1$ |
| (13) |       end |
| (14) |     end |
| (15) |   for $n = l : -1 : 1$ |
| (16) |     $\Delta = \bar{b}_n - \sum_{j=n+1}^{N_t} \tilde{R}_{n,j} \hat{z}_j$ |
| (17) |     $\hat{z}_n = \text{round}(\Delta/\tilde{R}_{n,n})$    *partial SIC* |
| (18) |     $l = n - 1$                *and RA* |
| (19) |     if $\gamma > 0$            *computation* |
| (20) |       $a_n = a_{n+1} + |\Delta - \tilde{R}_{n,n}\hat{z}_n|^2$ |
| (21) |       if $a_n > \gamma \to$ break |
| (22) |     end |
| (23) |   end |
| (24) |   if $\gamma < 0\ ||\ a_{l+1} \le \gamma$ |
| (25) |     $\hat{s} = Q_S\left[2T\hat{z} - (1+j)1_{N_t \times 1}\right]$ |
| (26) |     if $\gamma < 0\ ||\ \hat{s} == (2T\hat{z} - (1+j)1_{N_t \times 1}) \to$ break |
| (27) |     end |
| (28) |   end |
| (29) |   $[k, update, \Theta, \tilde{R}, \tilde{Q}, T, g] = \text{CLLL\_ITER}(k, \tilde{R}, \tilde{Q}, T, g)$ |
| (30) |   if *update* |
| (31) |     $l = \max(l, k+1);\ \bar{b}_{k:k+1,1} = \Theta \bar{b}_{k:k+1,1}$ |
| (32) |   end |
| (33) | end |

INCREMENTAL LATTICE REDUCTION SYSTEMS AND METHODS

CROSS-REFERENCE TO RELATED APPLICATIONS

This application claims the benefit of U.S. Provisional Application Ser. No. 61/422,871, filed on 14 Dec. 2010, which is incorporated herein by reference in its entirety as if fully set forth below.

FEDERALLY SPONSORED RESEARCH STATEMENT

This invention was made with Government support under Agreement/Contract number W911NF-10-1-0469, awarded by the U.S. Army Research Lab. The Government has certain rights in the invention.

TECHNICAL FIELD OF THE INVENTION

Embodiments of the present invention relate generally to signal processing systems and methods and, more particularly, to systems, devices, and methods for multiple-input multiple-output signal transmission detection.

BACKGROUND OF THE INVENTION

Multiple-Input Multiple-Output ("MIMO") communication systems are becoming increasingly popular as a solution to increasing demands for higher data-rates and more reliable wireless communication systems. These systems comprise multiple antennas at a transmitter side of the communication system and multiple antennas at the receiver side of the communication system. Each transmitter antenna can transmit a different signal at a common frequency through a different channel of the communication system. Each receiver antenna may receive each signal from the multiple transmitter-antennas. During transit, the transmitted signals may encounter different obstacles such that the frequency response of each channel is different. Thus, a common goal of conventional systems is to attempt to efficiently detect the transmitted symbols by determining the frequency response of each channel in the communication system.

Although the optimal solution to the MIMO symbol detection problem, Maximum Likelihood ("ML") detection, is known, a brute-force ML detector implementation involves an exhaustive search over all possible transmitted symbol vectors. This approach is infeasible for hardware implementations when either a large signal constellation or a large number of transmit and receive antennas are employed. Hence, a goal of conventional systems is to design hardware for MIMO symbol detection that achieves comparable Bit-Error-Rate ("BER") performance to the ML detector while having low hardware complexity and meeting throughput and latency requirements.

Some conventional MIMO symbol detections systems employ methods of linear detection and Successive Interference Cancelation ("SIC"). Because most of the required processing for these detectors need only occur at the maximum packet-rate (preprocessing) and the required symbol-rate processing has relatively low-complexity, the throughput requirements for certain wireless standards, such as 802.11n, can be achieved in these systems. These methods, however, do not collect the same diversity (negative logarithmic asymptotic slope of the BER versus Signal-to-Noise-Ratio ("SNR") curve) as ML detection. As a result, these methods exhibit greatly reduced system performance compared to ML detectors Other conventional symbol detection systems employ Sphere Decoding ("SD") algorithms. Hardware implementations of SD algorithms can achieve ML or near-ML performance. Unfortunately, these methods exhibit greatly increased symbol-rate processing complexity compared to linear or SIC detectors. The complexity of SD methods can also vary widely with changing channel conditions.

The maximum packet-rate of 802.11n is considerably less than the symbol-rate. Therefore, it is desirable to obtain detection systems and methods that achieve ML or near-ML performance at the cost of increased preprocessing complexity as opposed to increased symbol-rate processing complexity. Systems having these desired characteristics include Lattice Reduction ("LR") aided detectors, which, unlike SD methods, incorporate LR algorithms into the preprocessing part of linear or SIC detectors and only increase the symbol-rate processing complexity slightly. Specifically, LR systems and methods only require lattice reduction once per received packet (per subcarrier). LR-aided detectors also exhibit the desirable property of having a complexity that is independent of both the channel SNR and signal constellation (assuming individual arithmetic operations have O(1) complexity).

A variety of hardware realizations of LR-aided detectors have been explored to exploit these properties and to achieve near-ML performance. Various explorations have included a VLSI implementation of a simplified Brun's LR algorithm and a software implementation of Seysen's LR algorithm on a reconfigurable baseband processor. Frequently explored variants, however, employ the Complex Lenstra-Lenstra-Lovász ("CLLL") LR algorithm.

The CLLL algorithm has the desirable properties of requiring sorted QR-decomposition preprocessing instead of Direct Matrix Inversion ("DMI") preprocessing. Further, the CLLL algorithm has superior performance to the conventional MIMO detection systems and does not suffer from the scalability issues in some of the conventional systems. The CLLL algorithm can also be used to significantly reduce the complexity of SD algorithms. The conventional CLLL algorithm, however, is unable to be feasibly implemented in fixed-point hardware architecture. Thus, given the desirable properties of the CLLL algorithm, the focus of the majority of LR-aided detection research has been on either improving BER performance or decreasing the complexity of CLLL-aided algorithms. Accordingly, the inventors of the present invention set forth a novel LR-aided detection process—a CLLL-Minimum Mean Square Error ("MMSE")-SIC method—in U.S. patent application Ser. No. 12/943,824 entitled "Systems and Methods for Lattice Reduction," which is incorporated herein by reference in its entirety as if fully set forth below.

A problem with conventional LR-aided detection processes arises from the iterative steps they employ. These processes often continually iterate through complex computational algorithms creating high costs in processing power and time. Therefore, there is a desire for more efficient and less complex LR-aided detection systems and methods. Various embodiments of the present invention address these desires.

BRIEF SUMMARY OF THE INVENTION

The present invention relates to incremental lattice reduction systems and methods. An exemplary embodiment of the present invention provides an incremental lattice reduction method for MIMO communication systems. The method comprises: receiving an input signal at a plurality of input terminals; performing a first detection sub-method on at least a portion of the input signal to obtain a primary symbol vector estimate; evaluating a reliability assessment condition using the primary symbol vector estimate; terminating the incremental lattice reduction method if the reliability assessment condition is satisfied; and if the reliability assessment condition is not satisfied, performing at least one iteration of a second lattice reduction detection sub-method to obtain a secondary symbol vector estimate.

The second lattice reduction detection sub-method can be many lattice reduction detection methods or sub-methods known in the art. In an exemplary embodiment of the present invention, the second lattice reduction detection sub-method comprises a CLLL-MMSE-SIC process.

In another exemplary embodiment of the present invention, the method further comprises reevaluating the reliability assessment condition using the secondary symbol vector estimate after performing the at least one iteration of the second lattice reduction detection sub-method. In yet another exemplary embodiment of the present invention, the second lattice reduction detection sub-method comprises an SIC process, wherein the SIC process is performed concurrently with reevaluating the reliability assessment condition. In still another exemplary embodiment of the present invention, the method further comprises: early terminating the SIC process to obtain a partial symbol vector estimate; and early terminating evaluating the reliability assessment condition to obtain a partial reliability assessment computation. In still yet another exemplary embodiment of the present invention, the method further comprises: restarting the SIC process using the partial symbol vector estimate; and restarting evaluating the reliability assessment condition using the partial reliability assessment computation.

In some exemplary embodiments of the present invention, the incremental lattice reduction method further comprises reevaluating the reliability assessment condition using the secondary symbol vector estimate after performing a predetermined number of iterations of the second lattice reduction detection sub-method. In other exemplary embodiments of the present invention, the method further comprises reevaluating the reliability assessment condition using the secondary symbol vector estimate after performing a random number of iterations of the second lattice reduction detection sub-method. In still other exemplary embodiments of the present invention, the method further comprises reevaluating the reliability assessment condition using the secondary symbol vector estimate only if a basis update occurs during performing the at least one iteration of the second lattice reduction detection sub-method.

In some embodiments of the present invention, the reliability assessment condition is evaluated in a z-domain. In some embodiments of the present invention, the reliability assessment condition is evaluated in an s-domain. In an exemplary embodiment of the present invention, the second lattice reduction detection sub-method comprises an SIC process and a basis update process, wherein the SIC process and evaluating the reliability assessment condition are decoupled from the basis update process. In some exemplary embodiments of the present invention, evaluating the reliability assessment condition comprises choosing a value for a threshold parameter. In some embodiments of the present invention, the threshold parameter corresponds to a reliability of the incremental lattice reduction method.

In addition to incremental lattice reduction methods, various embodiments of the present invention are directed to incremental lattice reduction systems. An exemplary embodiment of the present invention provides an incremental lattice reduction system comprising a plurality of input terminals, a symbol detection estimate module, a reliability assessment ("RA") evaluating module, a terminating module, and a lattice reduction detection module. The plurality of input terminals can be configured to receive an input signal. The symbol detection estimate module can be configured to implement a primary detection sub-method to obtain a primary symbol vector estimate from at least a portion of the input signal. The RA evaluating module can be configured to evaluate a reliability assessment condition using the primary symbol vector estimate. The terminating module can be configured to terminate an incremental lattice reduction method if the reliability assessment condition is satisfied. The lattice reduction detection module can be configured to implement at least one iteration of a lattice reduction sub-method to obtain a secondary symbol vector estimate if the reliability assessment condition is not satisfied.

In another exemplary embodiment of the present invention, the RA evaluating module is further configured to evaluate the reliability assessment condition using the secondary symbol vector estimate. In various embodiments of the present invention, the lattice reduction detection module can be configured to implement at least one iteration of many lattice reduction detection sub-methods known in the art. In an exemplary embodiment of the present invention, the lattice reduction detection sub-method comprises a CLLL-MMSE-SIC process.

These and other aspects of the present invention are described in the Detailed Description of the Invention below and the accompanying figures. Other aspects and features of embodiments of the present invention will become apparent to those of ordinary skill in the art upon reviewing the following description of specific, exemplary embodiments of the present invention in concert with the figures. While features of the present invention may be discussed relative to certain embodiments and figures, all embodiments of the present invention can include one or more of the features discussed herein. While one or more embodiments may be discussed as having certain advantageous features, one or more of such features may also be used with the various embodiments of the invention discussed herein. In similar fashion, while exemplary embodiments may be discussed below as system or method embodiments, it is to be understood that such exemplary embodiments can be implemented in various devices, systems, and methods of the present invention.

BRIEF DESCRIPTION OF THE DRAWINGS

The following Detailed Description of the Invention is better understood when read in conjunction with the appended drawings. For the purposes of illustration, there is shown in the drawings exemplary embodiments, but the subject matter is not limited to the specific elements and instrumentalities disclosed.

FIG. 4 provides pseudo code for implementing an incremental lattice reduction method, in accordance with an exemplary embodiment of the present invention.

DETAILED DESCRIPTION OF THE INVENTION

To facilitate an understanding of the principles and features of the invention, various illustrative embodiments are explained below. In particular, the invention is described in the context of being systems and methods for lattice reduction for MIMO communication systems. Embodiments of the present invention may be applied to many wireless MIMO communication system standards known in the art, including, but not limited to, IEEE 802.11 (Wi-Fi), 4G, 3GPP, Long Term Evolution, Wi-MAX, HSPA+, and the like. Embodiments of the invention, however, are not limited to use in wireless MIMO communication systems. Rather, embodiments of the invention can be used for processing other MIMO communication systems, including, but not limited to, optical MIMO systems or other transmission systems having an architecture incorporating multiple transmitters and/or multiple transceivers.

The components described hereinafter as making up various elements of the invention are intended to be illustrative and not restrictive. Many suitable components or steps that would perform the same or similar functions as the components or steps described herein are intended to be embraced within the scope of the invention. Such other components or steps not described herein can include, but are not limited to, for example, similar components or steps that are developed after development of the invention.

In some embodiments of the present invention, BER performance is maintained when LR is selectively applied. For example, this selective application can be based on an early termination criteria that is based on symbol detection estimates computed during LR processing. This selective application of LR based on early termination can be referred to as Incremental Lattice Reduction ("ILR") because LR processing may execute gradually over the duration of a received packet. Conveniently, in some embodiments of the present invention, the additional operations employed by some embodiments of the present invention can be executed in parallel with the original LR processing. Therefore, some embodiments of the present invention allow the relaxation of the latency and throughput specifications of LR algorithm hardware realizations.

The following paragraph describes the notation used herein. Superscript $^H$ denotes Hermitian, $*$ conjugate, and $^T$ transpose. The real and imaginary parts are denoted as $\Re[\bullet]$ and $\Im[\bullet]$, respectively. j is used to represent $\sqrt{-1}$. $|a|$ is reserved for the absolute value of scalar a or cardinality of a if a is a set, $\|a\|$ for the 2-norm of vector a, $E[\bullet]$ for expectation, and $\det(A)$ for the determinant of A. $I_N$ denotes the N×N identity matrix. Unless explicitly stated otherwise, the n-th element of a vector x is denoted by $x_n$, and the (m,n)-th element of a matrix X is denoted by $X_{m,n}$. Lastly, $0_{M \times N}$ and $1_{M \times N}$ are used to denote an M×N matrix of all zeros or ones, respectively.

Various embodiments of the present invention can be implemented in MIMO communication systems. For example, consider a flat-fading MIMO communication system with $N_t$ transmit-antennas and $N_r$ receive-antennas. The data stream in these embodiments can be divided into $N_t$ sub-streams and transmitted through $N_t$ antennas. $s=[s_1, s_2, \ldots, s_{N_t}]^T \in S^{N_t}$ can represent the $N_t \times 1$ transmitted data vector at one time slot where S can be the constellation set of each element in s. H can be the $N_r \times N_t$ channel matrix corresponding to a channel in the exemplary MIMO communication system. $y=[y_1, y_2, \ldots, y_{N_r}]^T$ can denote the received signal at one time slot from $N_r$ receive-antennas. The input-output relationship for the exemplary MIMO communication system can be represented by Equation 1.

$$y = Hs + \eta\omega \quad \text{Equation 1:}$$

In Equation 1, $$\eta = \sqrt{\frac{E[s^H s]}{N_t}}$$

and $\omega=[\omega_1, \omega_2, \ldots, \omega_{N_r}]^T$ can be the white Gaussian noise vector observed at the $N_r$ receive-antennas with zero mean and covariance matrix $E[\omega\omega^H]=\sigma_\omega^2 I_{N_r}$. In some embodiments of the present invention, the elements of H can be independent identically distributed ("i.i.d.") complex Gaussian distributed coefficients with zero mean and unit variance. Additionally, in some embodiments of the present invention, a noise variance $\sigma_w^2$ is known at the receiver, and H is known at the receiver but unknown at the transmitter. The per-antenna SNR under this exemplary system model can be represented by $1/\sigma_\omega^2$. Given this model system, symbol detection can be the process of determining an estimate ŝ of the symbol vector s that was sent based on knowledge of H, y, and $\sigma_w^2$.

It has been shown that the complexity of SD increases rapidly with increasing spatial correlation at the receiver or transmitter. Similar to SD algorithms, the complexity of LR-aided detection algorithms also varies with changing channel conditions. Consequently, this spatial correlation channel matrix model is more appropriate than the often adopted canonical channel matrix model for evaluating the lattice reduction methods described herein.

The effects of spatial correlation at the transmitter and receiver can be modeled by incorporating positive definite square correlation matrices into the channel matrix model. By letting $\Sigma_{rx}$ and $\Sigma_{tx}$ be the receive and transmit correlation matrices with dimensions $N_r \times N_r$ and $N_t \times N_t$, respectively, the channel matrix can be modeled using Equation 2.

$$H = \Sigma_{rx}^{1/2} H' \Sigma_{tx}^{1/2} \quad \text{Equation 2:}$$

In Equation 2, H' is an $N_r \times N_t$ complex matrix having i.i.d. complex Gaussian distributed elements with zero mean and unit variance. These matrices can be generated by using code available as part of the IST-2000-30148 I-METRA project.

In conventional LR-aided detection schemes, the channel matrix can be first preprocessed, and then, this result can be used in symbol detection. The CLLL-MMSE-SIC detection algorithm has been considered for hardware implementation. Under this method, the CLLL algorithm is applied to the augmented channel matrix $\overline{H}$, which is defined in Equation 3.

$$\overline{H} = \begin{bmatrix} H \\ \sigma_\omega I_{N_t} \end{bmatrix} \quad \text{Equation 3}$$

Figure 1:
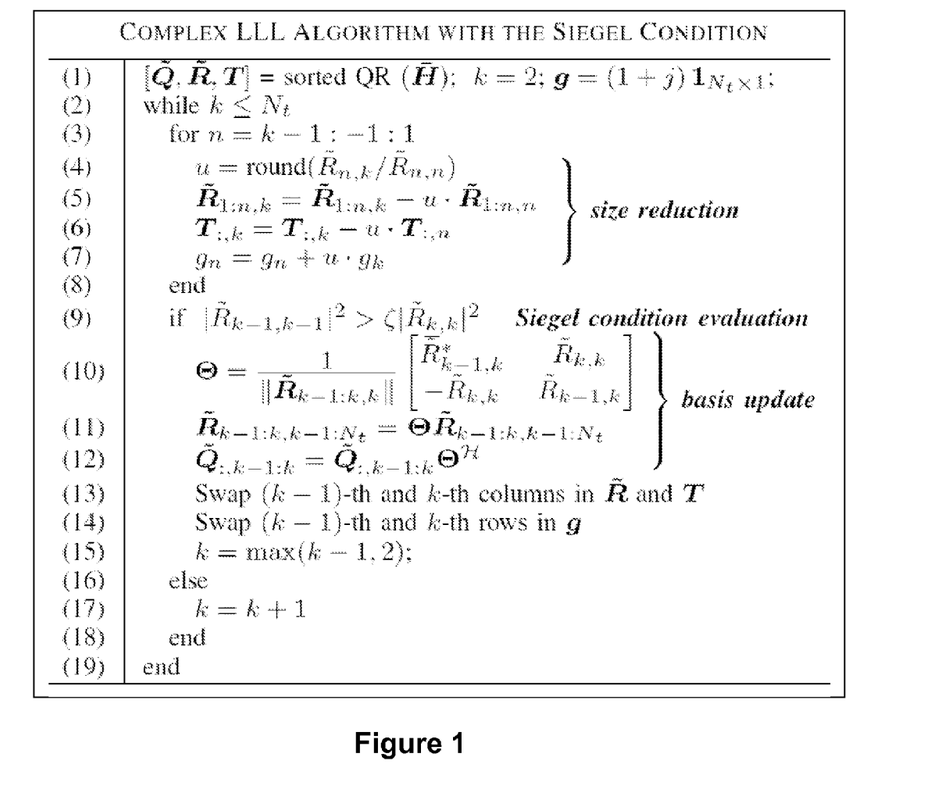
FIG. 1 provides pseudo code for implementing a lattice reduction sub-method, in accordance with an exemplary embodiment of the present invention.

The output of the CLLL algorithm is then the factorization $\overline{H}T=\tilde{Q}\tilde{R}$, where T is an $N_t \times N_t$ unimodular matrix, $\tilde{Q}$ is an $(N_r+N_t) \times N_t$ matrix having orthonormal columns, and $\tilde{R}$ is an $N_t \times N_t$ upper-triangular matrix with real-valued diagonal elements. As described in U.S. patent application Ser. No. 12/943,824, in some embodiments of the present invention, the Siegel condition variant of the CLLL algorithm is employed because the complexity of this variant is lower than the original CLLL algorithm, which was based on the Lovasz condition. Pseudo code for an exemplary embodiment of the Siegel condition variant of the CLLL algorithm is provided in FIG. 1. If the Siegel condition variant of the CLLL algorithm is run to completion, $\tilde{R}$ satisfies the complex size reduction condition represented by Equation 4 and the Siegel condition represented by Equation 5, where ç is an algorithm parameter chosen from the interval [2,4].

$$|\Re[\tilde{R}_{n,k}]|, |\mathcal{I}[\tilde{R}_{n,k}]| \leq \frac{1}{2}|\tilde{R}_{n,n}|, \forall 1 \leq n < k \leq N_t \quad \text{Equation 4}$$

$$|\tilde{R}_{k-1,k-1}|^2 \leq \varsigma|\tilde{R}_{k,k}|, \forall k \in [2, N_t] \quad \text{Equation 5}$$

For M-ary Quadrature Amplitude Modulation ("QAM") transmissions, a shifting and scaling step can be performed before the factorization in symbol detection. After considering this step and partitioning $\tilde{Q}$ into an $N_r \times N_t$ matrix $\tilde{Q}^{(1)}$ and $N_t \times N_t$ matrix $\tilde{Q}^{(2)}$ such that $$\tilde{Q} = \left[(\tilde{Q}^{(1)})^T (\tilde{Q}^{(2)})^T\right]^T,$$

Equation 6 can be obtained for the SIC detection process.

$$\tilde{R}z = \frac{1}{2}\left((\tilde{Q}^{(1)})^H y + \tilde{R}T^{-1}(1+j)1_{N_t \times 1}\right) \quad \text{Equation 6}$$

Letting $\hat{z}$ be the SIC "solution" to Equation 6, a symbol vector estimate can be found by computing $\hat{s}=Q_s[2T\hat{z}-(1+j)1_{N_t \times 1}]$, where the quantization function $Q_s$ quantizes each vector element to the closest symbol in S.

Based on an understanding of the channel model and CLLL-MMSE-SIC detection process discussed above, a determination can be made as to how spatial correlation at the receiver and transmitter affects the complexity of LR processing. For example, and not limitation, if it is assumed that the carrier frequency is 5 GHz, the angle of arrival ("AoA") is 45 degrees, the angular spread ("AS") is 40 degrees, and the antennas at the receiver and transmitter are spaced uniformly in a linear array. Under this exemplary configuration, $p_{tx}$ and $p_{rx}$ be the adjacent-antenna correlation coefficients at the transmitter and receiver, respectively. Additionally, $N_t=N_r=4$, and the worst-case $\sigma_\omega=0$ choice for the augmented channel matrix in Equation 3 can be used. This worst-case can be chosen such that none or little benefit is obtained from the complexity reduction normally achieved by incorporating a noise estimate into the detection algorithm. For simplicity, it can be assumed that the spatial correlation at the transmitter and receiver is identical.

Figure 2:
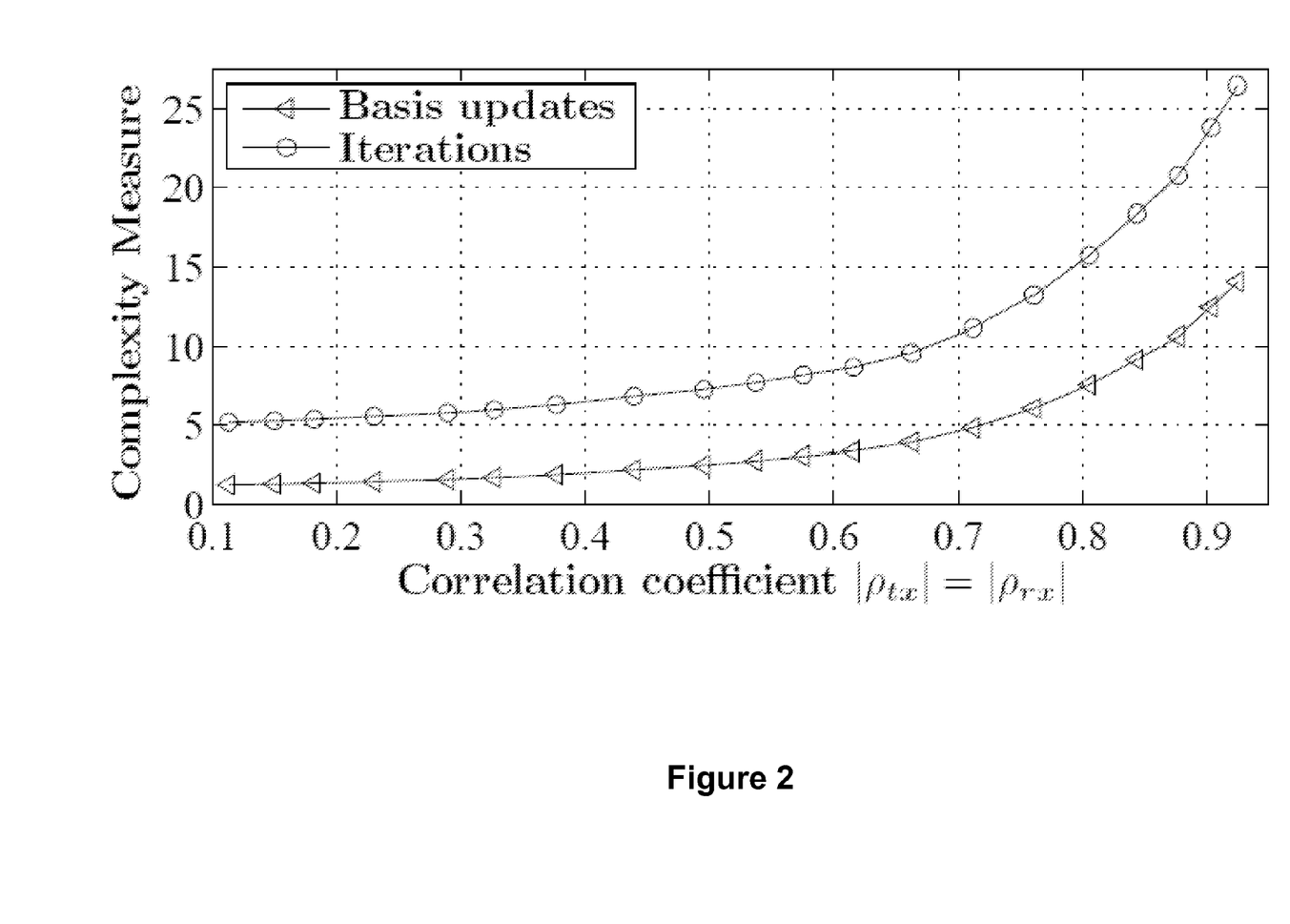
FIG. 2 provides a plot of the effect of spatial correlation on the complexity of the CLLL algorithm, in accordance with an exemplary embodiment of the present invention.

Using known software implementations, 4×4 H matrices can be generated for various spatial correlations between adjacent antennas (achieved by varying the relative antenna spacing) and the CLLL algorithm can be executed for each channel matrix realization. The average complexity for each spatial correlation case in the exemplary setup is provided in FIG. 2. In addition to the average number of CLLL algorithm iterations, the average number of basis updates (represented in lines 10-12 of FIG. 1) is also considered as a relevant measure of complexity. From FIG. 2, it is clear that the average complexity of the CLLL algorithm increases rapidly as the spatial correlation increases. This result is logical given that the condition number of the channel matrix increases as the spatial correlation at the receiver and/or transmitter increases.

Given these complexity characteristics, some embodiments of the present invention provide lattice reduction methods that do not perform all of the CLLL iterations and basis updates as conventional methods. The advantages of this feature can be shown by considering a hypothetical experiment. For example, suppose that for a given $\overline{H}$ and y the CLLL algorithm is first run to completion, obtaining an estimate $\hat{s}$ of the transmitted symbol vector. This estimate can be referred to as the actual $\hat{s}$. Now consider rerunning the CLLL algorithm again on $\overline{H}$. At the end of each iterations, however, a CLLL-MMSE-SIC detection process can be completed (using the intermediate $\tilde{Q}$, $\tilde{R}$, and T) to obtain a symbol vector estimate for each iteration. In an exemplary embodiment of the present invention, the CLLL detection process can be terminated early when the symbol vector estimate at the end of an iteration exactly matches the actual $\hat{s}$. This hypothetical experiment, therefore, provides information about a number of CLLL basis updates necessary to reach the actual $\hat{s}$.

Figure 3:
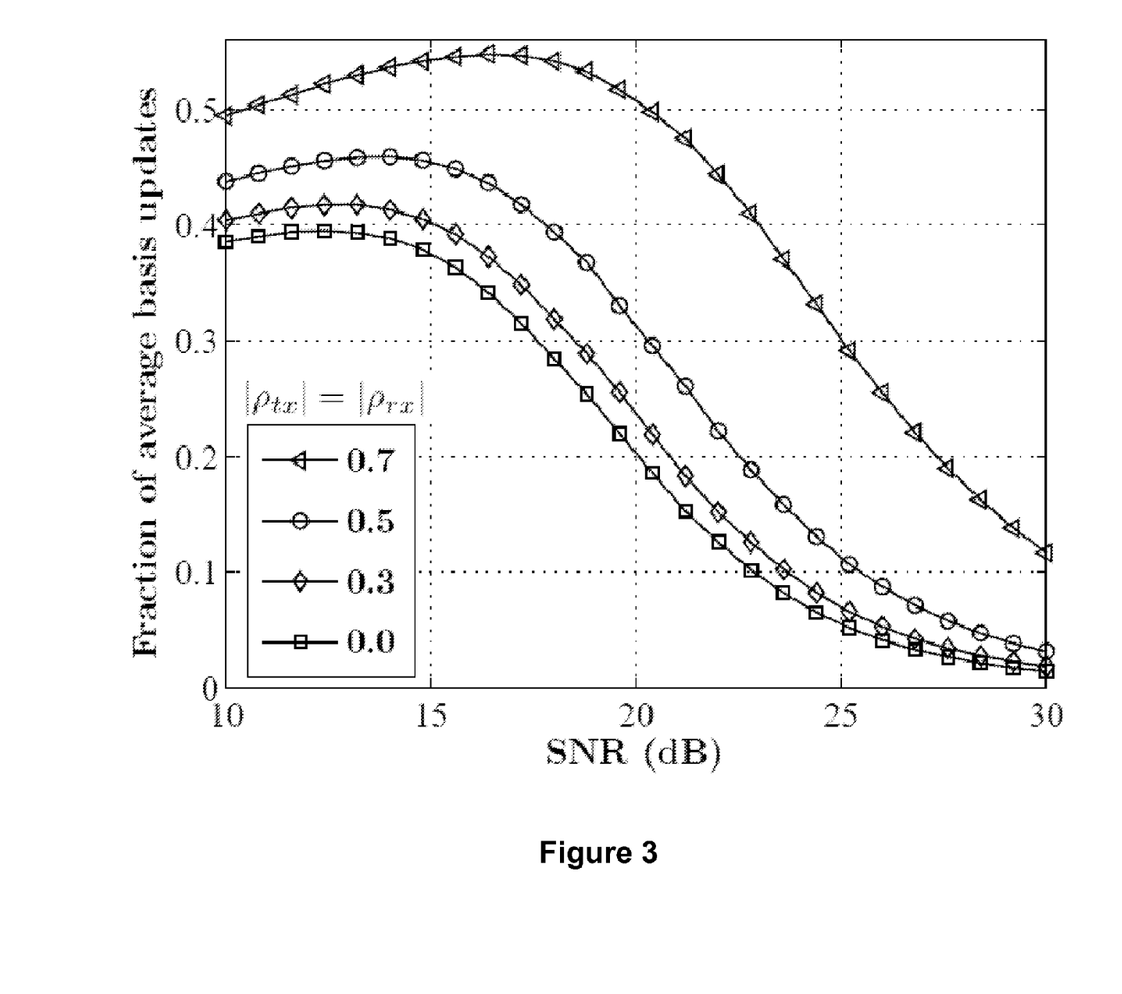
FIG. 3 provides a plot of the average number of basis updates performed when performing a lattice reduction detection sub-method, in accordance with an exemplary embodiment of the present invention.

This experiment can be run under the same assumptions as the previously discussed experiment except with varying $1/\sigma_\omega^2$ (SNR values). For each spatial correlation and SNR case, the average number of basis updates can be recorded for both the CLLL algorithm (with no early termination) and the CLLL algorithm with early termination (required basis updates). FIG. 3 contains the results of this experiment for 64-QAM transmissions. The average number of required basis updates can be reported as a fraction of average number of CLLL algorithm basis updates. Even when the spatial correlation is high, i.e. $|\rho_{tx}|=|\rho_{rx}|=0.7$, on average most CLLL algorithm basis updates are unnecessary for reasonable SNR values. Thus, an LR-aided detection method capable of early termination is desirable in the context of MIMO detection.

Accordingly, various exemplary embodiments of the present invention provide incremental lattice reduction systems and methods which terminate early if a reliability assessment condition is satisfied. In some embodiments of the present invention, the reliability assessment condition is repeatedly evaluated during execution of a lattice reduction detection sub-method. Moreover, in some embodiments of the present invention, the reliability assessment condition is evaluated prior to the first iteration of a lattice reduction detection sub-method and after one or more iterations of the lattice reduction detection sub-method.

In an exemplary embodiment of the present invention, an input signal is received at a plurality of input terminals. The input terminals can be many input terminals known in the art. In an exemplary embodiment of the present invention, the input terminals comprise antennas. Thus, some embodiments of the present invention can be applied to MIMO communication systems comprising multiple transmit antennas and multiple receive antennas. The present invention is not limited to only antennas. Instead, the various embodiments of the present invention can comprise many types of input terminals capable of receiving an input signal, including, but not limited to, radio-frequency signals, electromagnetic signals, optical signals, and the like. After the input signal has been received by the input terminals, in an exemplary embodiment of the present invention, a first symbol detection sub-method is performed to obtain a primary symbol vector estimate. In another exemplary embodiment of the present invention, a reliability assessment condition is evaluated using the primary symbol vector estimate. If the reliability assessment condition is satisfied, the incremental lattice reduction method can terminate. Termination of the method is acceptable because the satisfaction of the reliability assessment condition ensures the symbol vector estimate is reliable enough to ensure adequate BER.

If the reliability assessment condition is not satisfied, then the incremental lattice reduction method performs at least one iteration of a second lattice reduction detection sub-method to obtain a secondary symbol vector estimate. In an exemplary embodiment of the present invention, the second lattice reduction detection sub-method is run to completion to obtain the secondary symbol vector estimate. In this embodiment, the incremental lattice reduction method is still more efficient than conventional methods because the second lattice reduction detection sub-method is not performed if the reliability assessment condition is satisfied with the primary symbol vector estimate. In another exemplary embodiment of the present invention, a first predetermined number of iterations of the second lattice reduction detection sub-method are performed to obtain a secondary symbol vector estimate. The reliability assessment condition is reevaluated using the secondary symbol vector estimate. If the reliability assessment condition is then satisfied, the incremental lattice reduction method terminates. In an exemplary embodiment of the present invention, if the reliability assessment condition is not satisfied using the secondary symbol vector estimate, the incremental lattice reduction method performs a second predetermined number of iterations of the second lattice reduction detection sub-method to obtain another secondary symbol vector estimate that will be used to reevaluate the reliability assessment condition. The first and second predetermined numbers of iterations can be different or the same. In some embodiments of the present invention, these steps of performing a predetermined number of iterations of the second lattice reduction detection sub-method and reevaluating the reliability assessment condition using a secondary symbol vector estimate obtained from those iterations are repeated until with the reliability assessment condition is satisfied or the second lattice reduction sub-method is run to completion.

The first symbol detection sub-method can be many symbol detection methods or sub-methods known in the art, including but non-limited to, SIC methods, MMSE-SIC methods, zero-forcing methods, MMSE methods, latency-constrained SD methods, and the like. The second lattice reduction detection sub-method can be many lattice reduction methods known in the art, including but not limited to, CLLL methods, MMSE methods, SIC, methods, ML methods, full-diversity detection methods, and the like. As used herein, a method is a full-diversity detection method if it yields an asymptotic negative logarithmic slope of the bit-error-rate (BER) versus signal-to-noise-ratio (SNR) curve of the detector that is substantially equal to that of the ML detector. In an exemplary embodiment, the second lattice reduction detection sub-method has a complexity less than the complexity of the first symbol detection sub-method. In an exemplary embodiment of the present invention, the second lattice reduction detection sub-method comprises a CLLL-MMSE-SIC process, as described in U.S. patent application Ser. No. 12/943,824, which is incorporated herein by reference in its entirety as if fully set forth below.

It can be beneficial from a complexity and/or hardware perspective to modify and to integrate the reliability assessment calculation with the matrices involved in the lattice reduction detection sub-method. Towards this goal, the reliability assessment condition can be represented by Equation 7.

$$\|\bar{y}-\bar{H}\hat{s}_{init}\|\leq \bar{A}\sigma_\omega \quad \text{Equation 7:}$$

In Equation 7, $\bar{y}=[y^T,0_{1\times N_t}]^T$ and $\bar{A}$ is a positive, fixed threshold parameter. $\bar{A}$ can be described as a reliability threshold that corresponds to the reliability of the incremental lattice reduction method. For example, as $\bar{A}$ increases, the reliability assessment condition becomes easier to satisfy, such that the incremental lattice reduction detection system is less reliable. Similarly, as $\bar{A}$ decreases, the reliability assessment condition becomes more difficult to satisfy, such that the incremental lattice reduction method is more reliable, i.e. the symbol vector estimate is more accurate. Further, by starting with the left-hand side of Equation 7, it can be shown that Equation 8 is true, which demonstrates that the reliability assessment condition in Equation 7 is sufficient to ensure full-diversity detection.

$$\|\bar{y}-\bar{H}\hat{s}_{init}\|=\|y-\hat{H}\hat{s}_{init}\|^2+\sigma_\omega^2\|\hat{s}_{init}\|^2 > \|y-\hat{H}\hat{s}_{init}\|^2 \quad \text{Equation 8:}$$

Additionally, in some embodiments of the present invention, since $\hat{s}_{init}$ only changes when a basis update occurs, the incremental lattice reduction method only reevaluates the reliability assessment condition with the secondary symbol vector estimate if a basis update occurs during the performance of the at least one iteration of the second lattice reduction detection sub-method.

Assuming that no symbol quantization error occurs during the application of the $Q_s$ function in an exemplary CLLL-MMSE-SIC process, e.g. $\hat{s}=2T\hat{z}-(1+j)1_{N_t\times 1}$, the factorization returned by a CLLL algorithm can be used to express the relation in Equation 7 with Equation 9.

$$\left\|\tilde{R}\hat{z}-\frac{(\tilde{Q}^{(1)})^H y - \tilde{R}T^{-1}(1+j)1_{N_t\times 1}}{2}\right\|^2 \leq \frac{(\bar{A}\sigma_\omega)^2}{4} \quad \text{Equation 9}$$

Therefore, in some embodiments of the present invention, the reliability assessment condition can be evaluated in the z-domain. Additionally, in some embodiments of the present invention, the reliability assessment condition can be evaluated in the s-domain. Moreover, in some embodiments of the present invention, the evaluation of the reliability assessment condition can be integrated with an SIC computation that can be used to find $\hat{z}$ in Equation 6.

In some embodiments of the present invention, the fully-populated $\hat{z}$ is only needed from the final computation of $\hat{s}$. Therefore, the complexity of both the intermediate SIC and reliability assessment condition computation can be reduced by terminating the SIC detection in the z-domain when the reliability assessment condition is not satisfied. This termination can then be implemented efficiently by evaluating the reliability assessment condition as the SIC detection proceeds. It can also be noticed that when a basis update occurs during an iteration of the CLLL algorithm for a particular k in FIG. 1, the subsequent SIC detection result is unaffected in dimensions higher than k (compared to SIC detection before the basis update). Therefore, the partially computed $\hat{z}$ and partially computed left-hand side of Equation 9 can be stored and reused. This modification allows the incremental lattice reduction method to start a joint SIC/reliability assessment evaluation after each basis update at a $\hat{z}$ element having an index that is possibly less than N.

In some embodiments of the present invention, the $N_r \times 1$ vector in the right-hand side of Equation 6 can be computed before any SIC computation proceeds. Additionally, in some embodiments of the present invention, after a basis update, this vector can be recomputed before the updated $\tilde{R}$ can be used on the left-hand side of Equation 6 in the SIC and reliability assessment computation. Examination of Equation 6 reveals that during an iteration of a CLLL algorithm for a particular k, only the (k−1)-th and k-th rows of this vector are affected by a basis update. These two elements can be treated as a 2×1 vector. It is then apparent that the updated row elements can be found by pre-multiplying this 2×1 vector by the $\Theta$ matrix computed in Line 10 in FIG. 1.

In some embodiments of the present invention, this modification can be utilized such that basis updates on $\tilde{Q}$ are completely eliminated. In some embodiments of the present invention, however, the basis updates on $\tilde{Q}$ (and updates on g in Line 7 of FIG. 1) are not removed because then the right-hand side of Equation 6 can be computed efficiently using $\tilde{Q}$ for subsequent received vectors in a packet. The $\tilde{Q}$ generated during CLLL processing of a received vector may not be required until the next received vector in the packet. As a result, in some embodiments of the present invention, this modification essentially decouples the SIC and reliability assessment condition evaluation computations from the bases updates on $\tilde{Q}$.

The synthesis of the above described ideas leads to a joint lattice-reduction and symbol detection method for an exemplary embodiment of the present invention, for which the pseudo code is provided in FIG. 4. The code is partitioned into initialization operations that occur once per packet (Lines 1-2) and operations that occur for each received vector y (Lines 3-33). For the first received vector in a packet, the $\tilde{Q}$, $\tilde{R}$, and T from the packet initialization are used in Lines 3-4. For subsequent received vectors in the packet, the $\tilde{Q}$, $\tilde{R}$, T, and g that are computed during the processing of the previously received vector in the packet are used in Lines 3-4. More generally, the partially-reduced lattice is used to initialize the received vector processing after the first received vector in the packet is processed.

In the exemplary embodiment of the present invention illustrated in FIG. 4, the received vector processing comprises repeatedly executing the CLLL_$_{ITER}$ function in Line 29, which computes one iteration of a CLLL algorithm (Lines 3-18 in FIG. 1) given the current k and partially-reduced lattice. This function outputs the updated k and updated input matrices. It also outputs the update variable, indicating if a basis update occurs during that iteration, and the 2×2 matrix $\Theta$ for a possible basis update. This matrix can be used to update the $\bar{b}$ vector, which stores the right-hand side of Equation 6. The $\bar{b}$ vector can be used in the partial SIC and reliability assessment condition evaluation computations in Lines 15-23. To enable early termination of this computation, the current required starting index of the SIC computation in the l variable and the partial computation of the left-hand side of Equation 9 in the $\alpha$ vector can be tracked. In some embodiments of the present invention, this integration is enabled by incorporating the Siegel condition reevaluation in Lines 7-14.

In addition to incremental lattice reduction methods, exemplary embodiments of the present invention provide incremental lattice reduction detection systems. An exemplary embodiments of the present invention provides an incremental lattice reduction system comprising a plurality of input terminals, a symbol detection estimate module, an RA evaluating module, a terminating module, and a lattice reduction detection module. The input terminals can be many input terminals known in the art for receiving signals. In an exemplary embodiment of the present invention, the input terminals are antennas. The plurality of input terminals can be configured to receive an input signal. The symbol detection estimate module can be configured to implement a primary detection sub-method to obtain a primary symbol vector estimate from at least a portion of the input signal. The RA evaluating module can be configured to evaluate a reliability assessment condition using the primary symbol vector estimate. The terminating module can be configured to terminate an incremental lattice reduction method if the reliability assessment condition is satisfied. The lattice reduction detection module can be configured to implement at least one iteration of a lattice reduction sub-method to obtain a secondary symbol vector estimate if the reliability assessment condition is not satisfied.

In another exemplary embodiment of the present invention, the RA evaluating module is further configured to evaluate the reliability assessment condition using the secondary symbol vector estimate. In various embodiments of the present invention, the lattice reduction detection module can be configured to implement at least one iteration of many lattice reduction detection sub-methods known in the art. In an exemplary embodiment of the present invention, the lattice reduction detection sub-method comprises a CLLL-MMSE-SIC process.

In various exemplary embodiments of the present invention, the various modules described above can be implemented with hardware and/or software. In some embodiments of the present invention, the various modules can comprise logic instructions stored on memory that can be executed by a processor. The instructions can be configured to cause the system to perform the various steps of the various incremental lattice reduction methods described herein.

Figure 5:
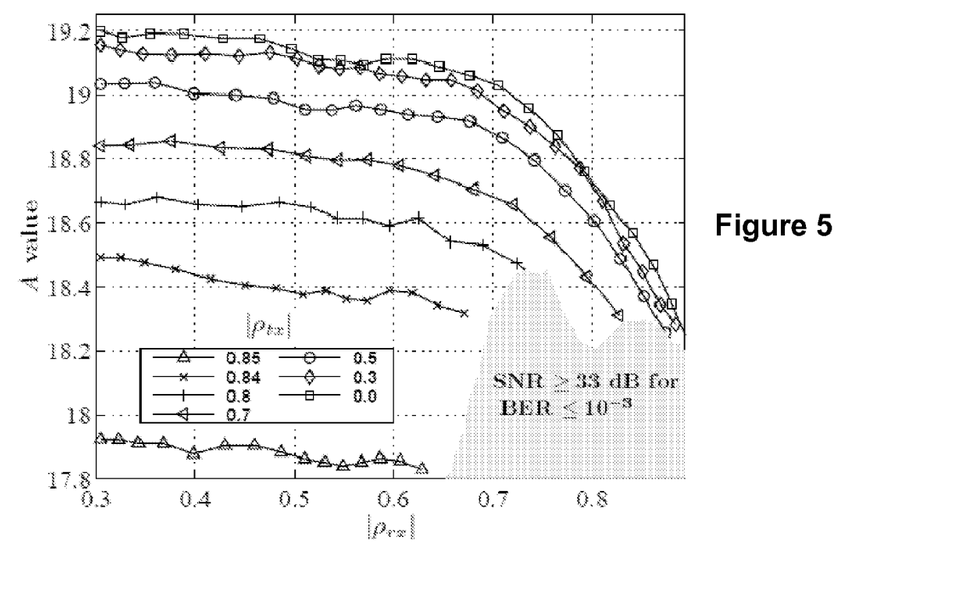
FIG. 5 provides a plot illustrating the effects of adjusting a reliability assessment threshold parameter, in accordance with an exemplary embodiment of the present invention.
Figure 6:
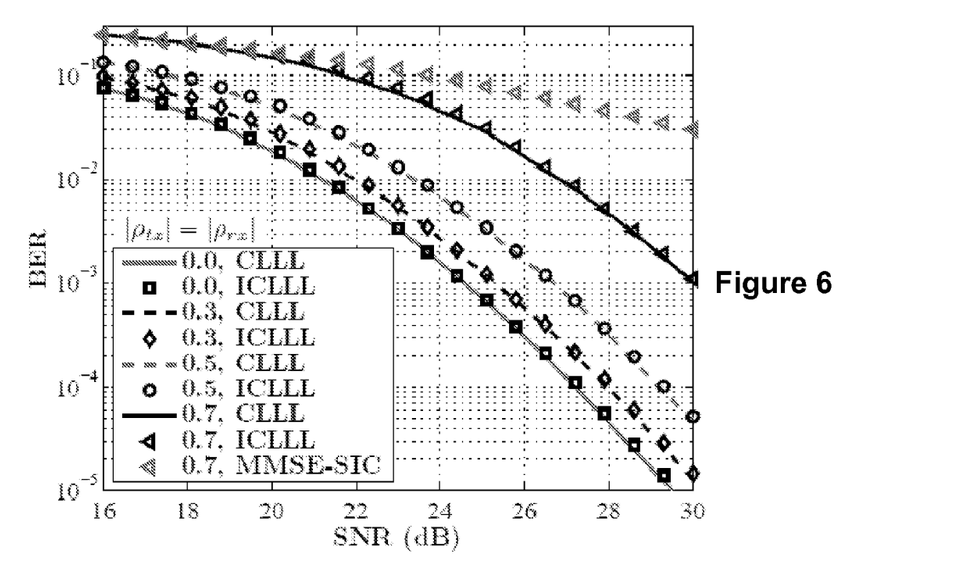
FIG. 6 provides plots illustrating performance of exemplary incremental lattice reduction systems and methods of the present invention as compared to conventional systems and methods.
Figure 7A:
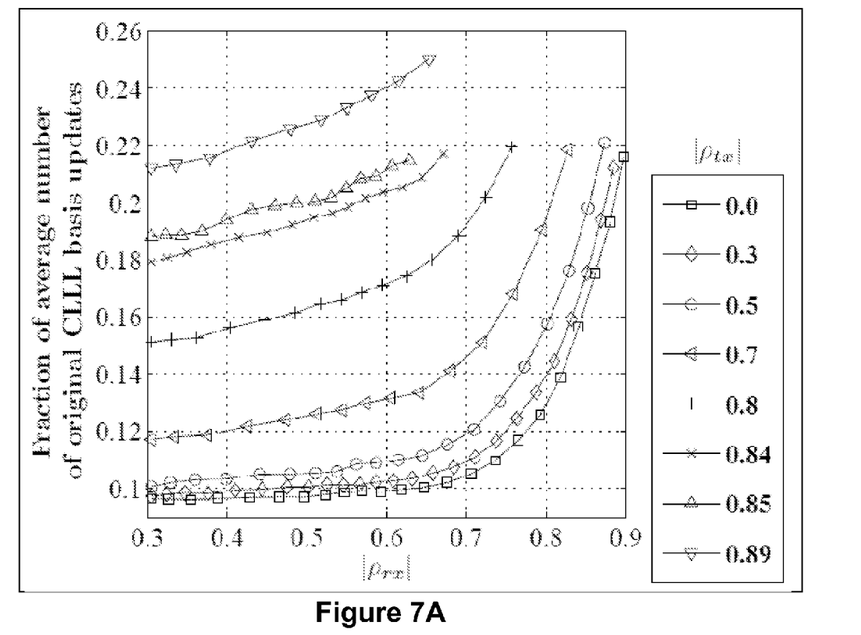
FIG. 7A provides plots of the average number of basis updates performed when using exemplary embodiments of the present invention.
Figure 7B:
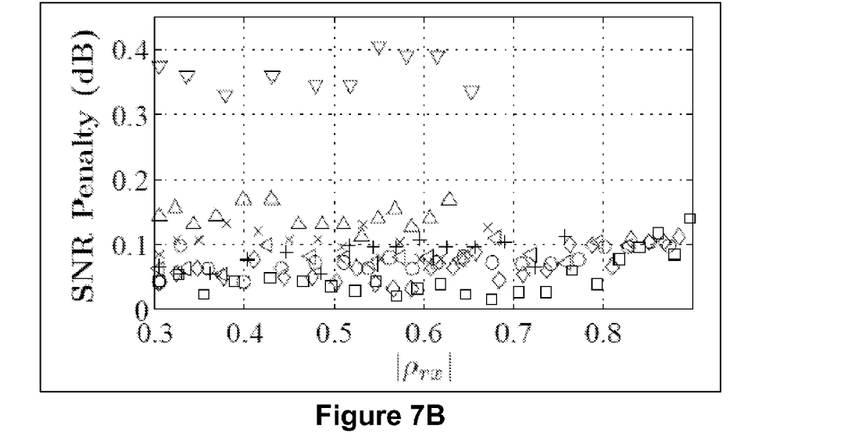
FIG. 7B provides a plot of SNR penalty for a variety of correlation cases when using exemplary embodiments of the present invention.
Figure 8:
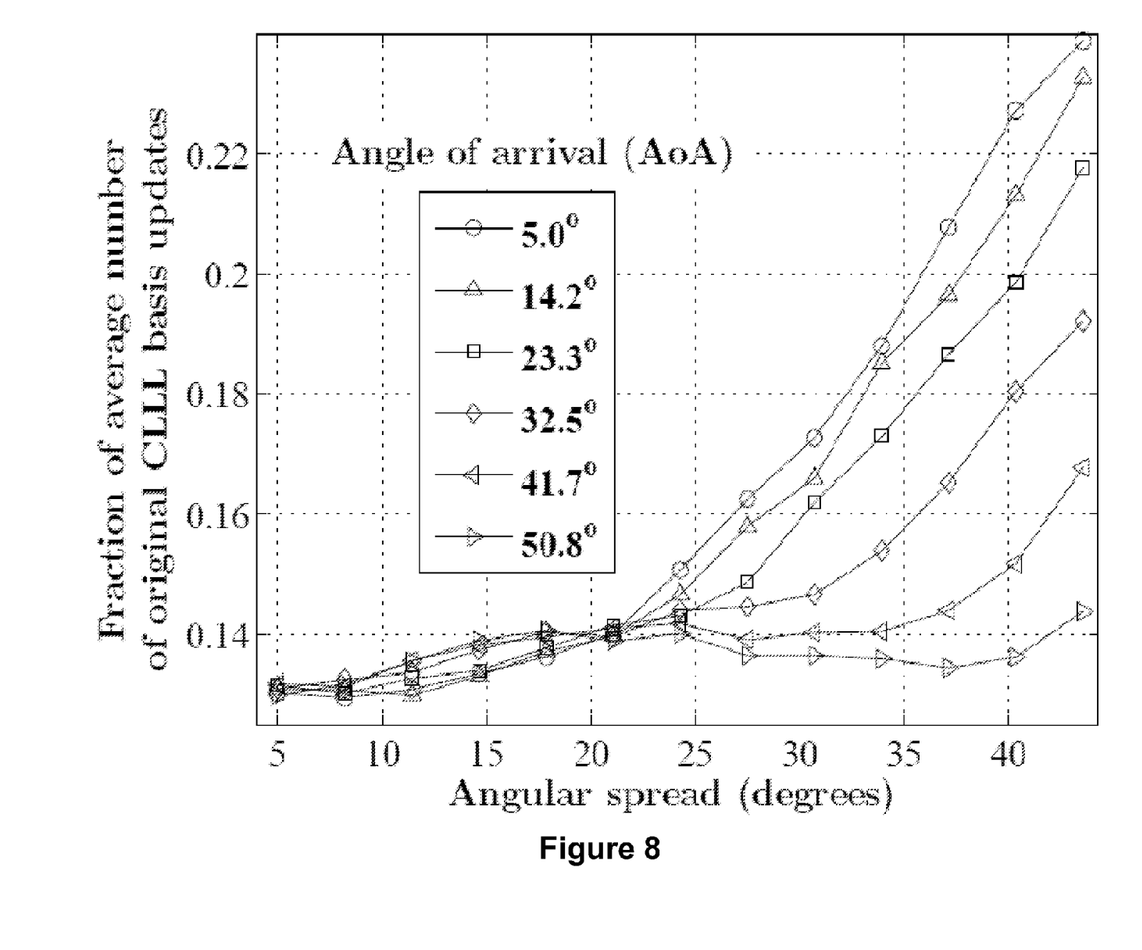
FIG. 8 provides a plot illustrating the average number of basis updates performed by an exemplary embodiment of the present invention as a fraction of the number of basis updates performed by conventional systems and methods.
Figure 9:
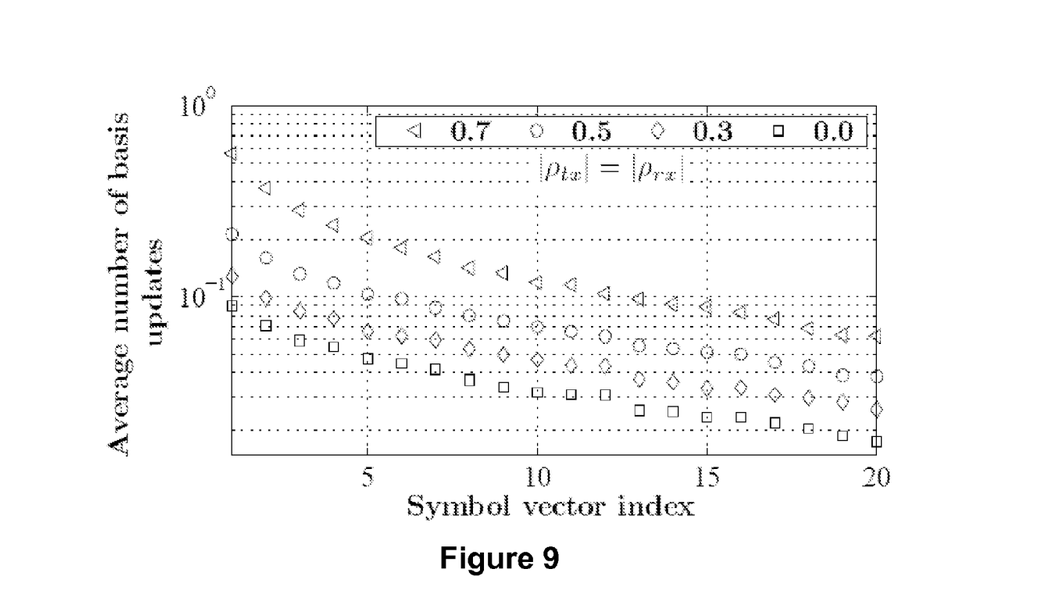
FIG. 9 provides a plot of the average number of basis updates performed for each received vector by an exemplary embodiment of the present invention.
Figure 10:
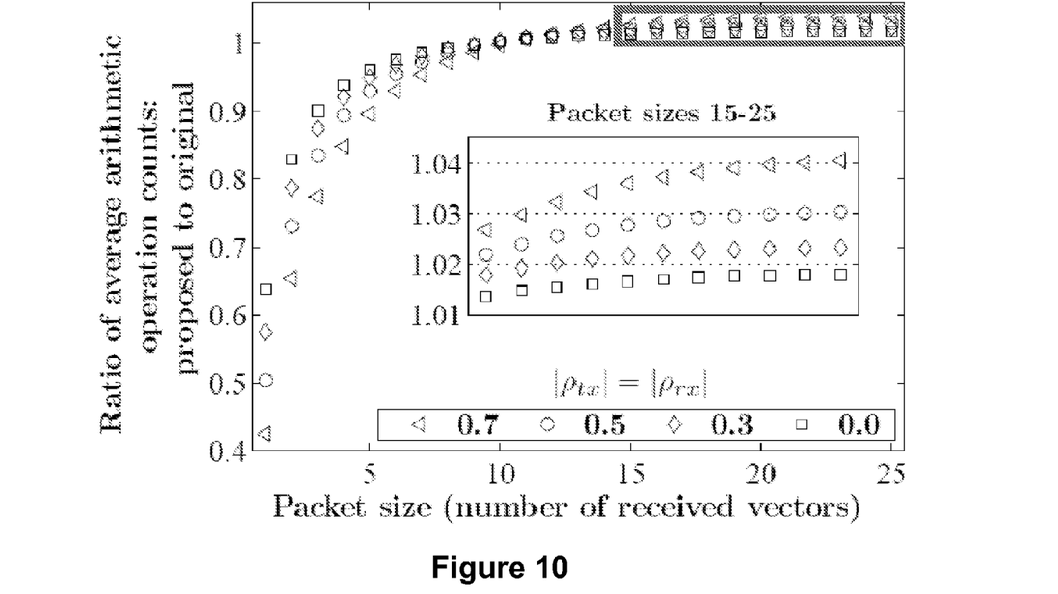
FIG. 10 provides a plot of the average number of arithmetic operations performed by an exemplary embodiment of the present invention normalized by the average number of arithmetic operations performed by a conventional method.

FIGS. 5-10 provide experimental results achieved by various embodiments of the present invention. FIG. 5 provides a plot of reliability threshold values for a variety of spatial correlation cases in accordance with exemplary embodiments of the present invention. These values were obtained based on assumptions, including a 4×4 MIMO system, 64-QAM signal constellation, AoA of 45 degrees, AS of 40 degrees, and a linear array of antennas at both the receiver and transmitter. FIG. 6 provides a plot of the 4×4 64-QAM performance of an exemplary embodiment of the present invention with the reliability threshold set to 18.2 compared to the performance of a CLLL-MMSE-SIC method. FIG. 7A provides an average number of basis updates performed by an exemplary embodiment of the present invention, and FIG. 7B provides corresponding SNR penalty for a variety of correlation cases. FIG. 8 provides a plot of the average number of basis updates performed by an exemplary embodiment of the present invention as a fraction of the number basis updates performed by a conventional CLLL method for a variety of AoA and AS cases. FIG. 9 provides a plot of the average number of basis updates executed by an exemplary embodiment of the present invention for each received vector, wherein the reliability assessment threshold is 18.2 and the packet size is 20. FIG. 10 provides a plot of the average number of arithmetic operations performed by an exemplary embodiment of the present invention normalized by the average number of arithmetic operations performed by a CLLL-MMSE-SIC method where the reliability assessment threshold is 18.2.

It is to be understood that the embodiments and claims disclosed herein are not limited in their application to the details of construction and arrangement of the components set forth in the description and illustrated in the drawings. Rather, the description and the drawings provide examples of the embodiments envisioned. The embodiments and claims disclosed herein are further capable of other embodiments and of being practiced and carried out in various ways. Also, it is to be understood that the phraseology and terminology employed herein are for the purposes of description and should not be regarded as limiting the claims.

Accordingly, those skilled in the art will appreciate that the conception upon which the application and claims are based may be readily utilized as a basis for the design of other structures, methods, and systems for carrying out the several purposes of the embodiments and claims presented in this application. It is important, therefore, that the claims be regarded as including such equivalent constructions.

Furthermore, the purpose of the foregoing Abstract is to enable the United States Patent and Trademark Office and the public generally, and especially including the practitioners in the art who are not familiar with patent and legal terms or phraseology, to determine quickly from a cursory inspection the nature and essence of the technical disclosure of the application. The Abstract is neither intended to define the claims of the application, nor is it intended to be limiting to the scope of the claims in any way. It is intended that the application is defined by the claims appended hereto.

What is claimed is:

1. An incremental lattice reduction method for a multiple-input multiple-output communication system, comprising:
   receiving an input signal at a plurality of input terminals;
   performing a first detection sub-method on at least a portion of the input signal to obtain a primary symbol vector estimate;
   evaluating a reliability assessment condition using the primary symbol vector estimate;
   terminating the incremental lattice reduction method if the reliability assessment condition is satisfied; and
   if the reliability assessment condition is not satisfied, performing at least one iteration of a second lattice reduction detection sub-method to obtain a secondary symbol vector estimate.

2. The incremental lattice reduction method of claim 1, wherein the second lattice reduction detection sub-method comprises a Complex-Lenstra-Lenstra-Lovasz-Minimum-Mean-Square-Error-Successive-Interference-Cancellation process.

3. The incremental lattice reduction method of claim 1, further comprising reevaluating the reliability assessment condition using the secondary symbol vector estimate after performing the at least one iteration of the second lattice reduction detection sub-method.

4. The incremental lattice reduction method of claim 3, wherein the second lattice reduction sub-method comprises a successive interference cancellation process, and wherein the successive interference cancellation process is performed concurrently with reevaluating the reliability assessment condition.

5. The incremental lattice reduction method of claim 4, further comprising:
   early terminating the successive interference cancellation process to obtain a partial symbol vector estimate; and
   early terminating evaluating the reliability assessment condition to obtain a partial reliability assessment computation.

6. The incremental lattice reduction method of claim 5, further comprising:
   restarting the successive interference cancellation process using the partial symbol vector estimate; and
   restarting evaluating the reliability assessment condition using the partial reliability assessment computation.

7. The incremental lattice reduction method of claim 1, further comprising reevaluating the reliability assessment condition using the secondary symbol vector estimate after performing a predetermined number of iterations of the second lattice reduction detection sub-method.

8. The incremental lattice reduction method of claim 1, further comprising reevaluating the reliability assessment condition using the secondary symbol vector estimate after performing a random number of iterations of the second lattice reduction detection sub-method.

9. The incremental lattice reduction method of claim 1, further comprising reevaluating the reliability assessment condition using the secondary symbol vector estimate only if a basis update occurs during performing the at least one iteration of the second lattice reduction detection sub-method.

10. The incremental lattice reduction method of claim 1, wherein the reliability assessment condition is evaluated in a z-domain.

11. The incremental lattice reduction method of claim 1, wherein the reliability assessment condition is evaluated in an s-domain.

12. The incremental lattice reduction method of claim 1, wherein the second lattice reduction detection sub-method comprises a successive interference cancellation process and a basis update process, and wherein the successive interference cancellation process and evaluating the reliability assessment condition are decoupled from the basis update process.

13. The incremental lattice reduction method of claim 1, wherein evaluating the reliability assessment condition comprises choosing a value for a threshold parameter.

14. The incremental lattice reduction method of claim 13, wherein the threshold parameter corresponds to a reliability of the incremental lattice reduction method.

15. An incremental lattice reduction method comprising:
    receiving an input signal at a plurality of input terminals;
    evaluating a reliability assessment condition using a primary symbol vector estimate of at least a portion of the input signal;
    terminating the incremental lattice reduction method if the reliability assessment condition is satisfied; and
    if the reliability assessment condition is not satisfied, performing at least one iteration of a lattice reduction detection sub-method to obtain a secondary symbol vector estimate.

16. The incremental lattice reduction method of claim 15, wherein the lattice reduction detection sub-method comprises a Complex-Lenstra-Lenstra-Lovasz-Minimum-Mean-Square-Error-Successive-Interference-Cancellation process.

17. The incremental lattice reduction method of claim 15, further comprising reevaluating the reliability assessment condition using the secondary symbol vector estimate after performing the at least one iteration of the lattice reduction detection sub-method.

18. An incremental lattice reduction system comprising, a plurality of input terminals configured to receive an input signal;
- a symbol detection estimate module configured to implement a primary detection sub-method to obtain a primary symbol vector estimate from at least a portion of the input signal;
- a reliability assessment evaluating module configured to evaluate a reliability assessment condition using the primary symbol vector estimate;
- a terminating module configured to terminate an incremental lattice reduction method if the reliability assessment condition is satisfied; and
- a lattice reduction detection module configured to implement at least one iteration of a lattice reduction detection sub-method to obtain a secondary symbol vector estimate if the reliability assessment condition is not satisfied.

19. The incremental lattice reduction system of claim 18, wherein the RA evaluating module is further configured to evaluate the reliability assessment condition using the secondary symbol vector estimate.

20. The incremental lattice reduction system of claim 18, wherein the lattice reduction detection sub-method comprises a Complex-Lenstra-Lenstra-Lovasz-Minimum-Mean-Square-Error-Successive-Interference-Cancellation process.

* * * * *